United States Patent [19]

Vester

[11] Patent Number: 5,519,171
[45] Date of Patent: May 21, 1996

[54] WIRE SPLICE ENCLOSURE

[76] Inventor: Danny R. Vester, Rte. 1, Box 374, Spring Hope, N.C. 27882

[21] Appl. No.: 317,374

[22] Filed: Oct. 3, 1994

[51] Int. Cl.⁶ .................................................. H02G 15/08
[52] U.S. Cl. ................... 174/84 R; 174/84 S; 174/88 R; 174/88 S; 174/91
[58] Field of Search .................. 174/84 R, 84 S, 174/91, 88 R, 88 S, 79, 75 R

[56] References Cited

U.S. PATENT DOCUMENTS

| | | | |
|---|---|---|---|
| 2,725,545 | 11/1955 | Gordon . | |
| 2,977,403 | 3/1961 | Reitz | 174/84 R |
| 3,471,823 | 10/1969 | Renshaw, Jr. . | |
| 3,654,588 | 4/1972 | Ruth . | |
| 3,803,532 | 4/1974 | Taxon | 174/84 S |
| 3,810,078 | 5/1974 | Chordas | 174/84 C |
| 4,337,374 | 6/1982 | Smith | 174/138 F |
| 4,849,580 | 7/1989 | Reuter | 174/92 |
| 4,944,699 | 7/1990 | Velke, Sr. et al. | 174/84 S |
| 5,107,077 | 4/1992 | Fox et al. | 174/138 F |

FOREIGN PATENT DOCUMENTS 607249   8/1948   United Kingdom .................. 174/84 R Primary Examiner—Morris H. Nimmo
Attorney, Agent, or Firm—Olive & Olive

[57] ABSTRACT

The wire splice enclosure of the preferred embodiment provides a two-piece sealable cylindrical enclosure having a tension plate at each end formed parallel to the axis of the enclosure. Each tension plate is formed with a serpentine concave track of a size adapted to snugly receive a wire for splicing, with a hole adjacent the track inner end sized to allow the wire to snugly pass through into a chamber area. A pair of hooks within the chamber area provides support for the wire ends after splicing. The two pieces of the chamber are adapted to seal together with a quarter turn locking motion.

8 Claims, 1 Drawing Sheet

5,519,171

1

WIRE SPLICE ENCLOSURE

FIELD OF THE INVENTION

This invention relates to a device for enclosing electrical wire splices, and more particularly to a device for the protection of wire splices against a failure due to environmental exposure or to tension forces.

BACKGROUND OF THE INVENTION

The transmission of electricity for power and electrical signals for communication is accomplished through conductors or wires. Wires are spliced, or linearly connected, at various locations and for various reasons. Among other reasons, wires are spliced to increase the functional length beyond the length available on a single reel and to effect a repair in a case of breakage. The process of splicing wires typically involves removing an electrically insulative coating from the end portions of two wires to be spliced together. The uninsulated portions of the two wires are next twisted or clamped together in electrical contact and the bare twisted portions of the contacting wires are enclosed within an insulating cover.

When such a splice is formed with wires which will be exposed to the environment, two effects may occur and potentially harm the integrity of the splice. One such effect is the infiltration of water under the insulating cover which can create an electrical short circuit between two or more parallel wires and interrupt power service or interfere with signal continuity. Another such effect is the degradation of the insulating cover of the splice by exposure to heat and ultraviolet rays from sunlight. This degradation can eventually cause the insulating cover to disintegrate, thereby exposing bare portions of wires to physical contact with each other or to a moisture-caused short circuit as mentioned above.

Furthermore, a splice is frequently subjected to physical stress, or tension. Considerable tension is inherent in stretching a wire between successive suporting poles. If the integrity of the splice is based entirely on the strength of two wires being twisted together, excess tension may cause the splice to come apart. A failed wire splice, either due to a short circuit or a separation, will cause an inconvenience and a possible danger, incurring time and expense to repair.

It is therefore an object of this invention to provide a wire splice enclosure which protects the splice from ambient moisture.

It is a further object of this invention to provide a wire splice enclosure which protects the splice from damage due to radiation exposure.

It is an additional object of this invention to provide a wire splice enclosure which protects the splice from tension damage.

Other objects and advantages will be more fully apparent from the following disclosure and appended claims.

SUMMARY OF THE INVENTION

The present invention provides a wire splice enclosure which combines a chamber capable of enclosing and sealing a splice against sunlight and moisture with a tension-relieving frame. The chamber comprises a tube and an interlocking cap which are sealed together with a quarter-turn locking mechanism. The enclosure parts are made of a moderately soft material so as to deform under compression and seal against one another. The tube and the cap each have a hole of a size and shape adapted to snugly surround each respective wire entering the chamber area and a narrow serpentine track distributing the effect of tension after forming the splice. The cap also has a central stem with a set of hooks adapted to support each of the wires within the chamber. The stem extends axially and is positioned to reside within the chamber when it is closed.

DETAILED DESCRIPTION OF THE INVENTION

Figure 1:
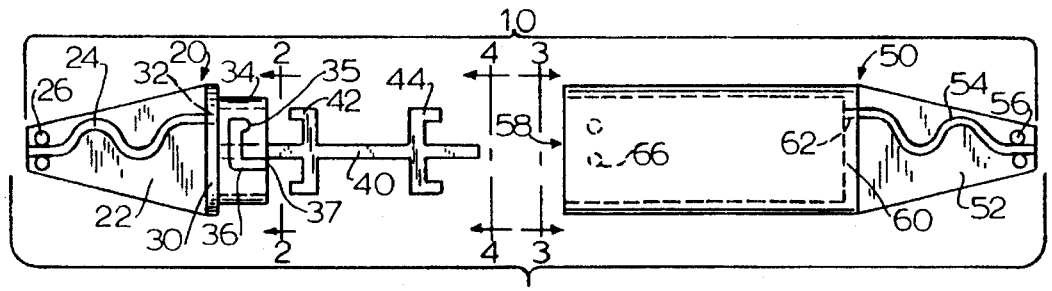
FIG. 1 is an exploded side elevation view of the enclosure of the invention in condition to receive wires to be spliced.

According to the objects outlined above, FIGS. 1, 2, 3 and 4 portray the enclosure device of the invention without a wire installed for splicing. FIG. 1 illustrates enclosure 10 comprising cap 20 and tube 50 in position juxtaposed to each other. When locked together, cap 20 and tube 50 form a chamber to enclose a wire splice. Cap 20 includes round closure plate 30 having substantially planar tension plate 22 formed perpendicular on the distal surface and stem 40 perpendicular on the proximal surface thereof. A serpentine wire path, such as tension track 24, is formed into the surface of tension plate 22 and adapted to snugly engage at least half the periphery of a wire placed therein. In addition, pins 26 are formed to perpendicularly protrude from plate 22 to closely surround tension track 24 near its distal end. The proximal end of tension track 24 is aligned with a hole 32 which is formed eccentrically through plate 30. Hole 32 is of a diameter and shape to snugly surround a wire being inserted for splicing and enclosure in enclosure 10.

Figure 2:
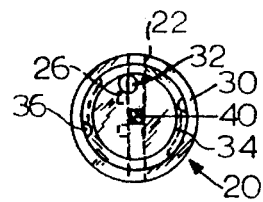
FIG. 2 is a cross sectional view taken in the direction of line 2—2 of FIG. 1.
Figure 4:
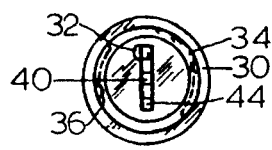
FIG. 4 is a cross sectional view taken in the direction of line 4—4 of FIG. 1.

Stem 40 is integrally formed substantially concentric with closure plate 30 in a position adjacent hole 32 as seen in FIGS. 1, 2 and 4. Stem 40 has a pair of integrally formed left hand hooks 42 which face toward closure plate 30 and a pair of integrally formed right hand hooks 44 which face away from closure plate 30. Left hand hooks 42 and right hand hooks 44 are spaced from one another along the length of stem 40. Hooks 42, 44 are adapted to receive and support wires whose respective ends are spliced during enclosure within enclosure 10. Sleeve 34 is integrally formed concentrically with and on the proximal surface of closure plate 30 so as to surround hole 32 and the distal portion of stem 40. The outer cylindrical surface of sleeve 34 is formed with a pair of L-shaped grooves, as viewed in FIG. 1, and establishing locking tracks 36. The two locking tracks 36 are diametrically opposed. The respective base portions of tracks 36 extend clockwise to form a quarter-turn receptor for a pair of inwardly directed pins of a mating component. At the extremity of the base portion of "L" shaped track 36, the track extends proximally so as to form a secure holding cavity 35 for a mating pin.

Figure 3:
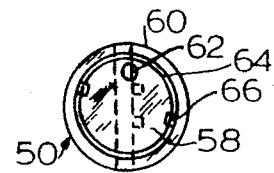
FIG. 3 is a cross sectional view taken in the direction of line 3—3 of FIG. 1.

Continuing with FIG. 1 and with attention to FIG. 3, tube 50 is formed with open end 58 configured to fit slidingly over sleeve 34 and seal against closure plate 30. A pair of diametrically opposed, inwardly directed pins 66 are formed on the inner surface of tube 50 in position to mate with locking tracks 36 of cap 20. When tube 50 is fitted together with cap 20, each pin 66 is initially aligned with the entry 37 of a respective track 36. Pins 66 are moved along tracks 36 as the segments 20 and 50 are pushed against each other and then twisted clockwise to engage each pin 66 into the base cavity 35 of each respective track 36.

The distal end of tube 50 is closed with end plate 60. Tension plate 52 is formed perpendicular to the distal surface of end plate 60. Tension plate 52 includes track 54 and pins 56 substantially identical to the comparable parts of cap 20. Hole 62 is aligned with the proximal end of tension track 54 and sized to snugly surround a wire placed therethrough.

Enclosure 10 is preferrably formed of a compressible, moldable material, such as, for example, neoprene synthetic rubber. The density and conformability of neoprene rubber is suited to proper sealing between the components of the enclosure 10 when under compression. A commercially available inhibitor is added to the synthetic rubber compound to reduce the degradation of the rubber which would otherwise be caused by exposure to sunlight, thus extending the useful life of the enclosure. Neoprene rubber also has adequate tensile strength to sustain the anticipated tensile forces applied to a splice. It is recognized that tensile and compressive strengths are related to the cross sectional area of the parts involved. Therefore, the components of enclosure 10 are sized according to the particular application for which it is intended.

Figure 5:
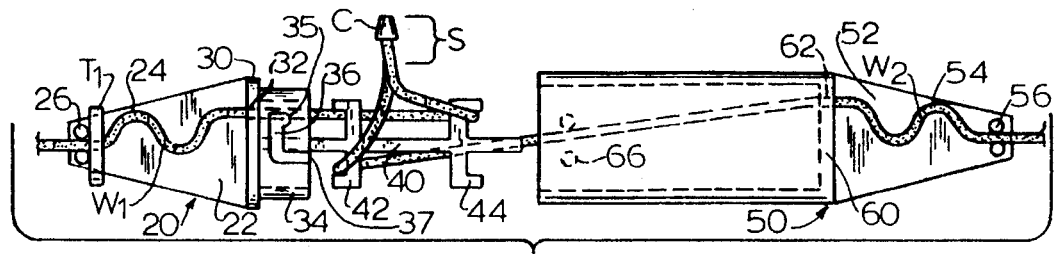
FIG. 5 is the view of the enclosure of FIG. 1 with two wires spliced together and in condition to be enclosed.

The mode of use of enclosure 10 is best illustrated in FIG. 5 in which two wires W1, W2, each having a single conductor (for clarity) are shown entering from each end. It is understood that splices formed between cables having two or more parallel conductors is common and easily accomplished, depending on the size of the enclosure relative to the size of the cable. An end of an insulated wire W1 is placed through hole 32 in closure plate 30, allowing a sufficient length of wire W1 on the proximal side of plate 30 for ease of handling. Next, an end of an insulated wire W2 which is to be spliced to wire W1 is placed through hole 62 in base plate 60, allowing a sufficient length of wire W1 on the proximal side of plate 30 for ease of handling. The insulation is stripped from the ends of wires W1, W2 to a length sufficient for splicing. The bare ends of wires W1, W2 are twisted or clamped together to form splice S. An insulating cover C, such as a cap or insulative tape, is placed around splice S. Wire W1 is placed over hook 44, and the excess length of wire W1 is pulled back through hole 32 in closure plate 30, allowing splice S to remain between books 42 and 44. Then, the portion of wire W1 which is on the distal side of closure plate 30 is pressed into tension track 24 and between pins 26. A wire tie, or strap $T_1$ as is known, is firmly wrapped around tension plate 22 adjacent pins 26 to hold wire W1 securely in tension track 24. The next step is to place wire W2 around hook 42, leaving splice S supported between hooks 42 and 44. The distal end of wire W2 is held while tube 50 is moved into contact with cap 20 with pins 66 engaging locking tracks 36. When closure plate 30 is in contact with tube open end 58, the two segments 20, 50 of enclosure 10 are pressed firmly together and locked with a one-quarter turn clockwise, leaving pins 66 nested in cavities 35 at the end of tracks 36 (see FIG. 6). Finally, wire W2 is pressed into serpentine tension track 54 and tied with strap $T_2$ around plate 52 and adjacent pins 56 according to the method described above in relation to wire W1. If either wire W1 or wire W2 does not fill respective hole 32, 62, putty or caulk can be added to seal holes 32, 62 against moisture.

Figure 6:
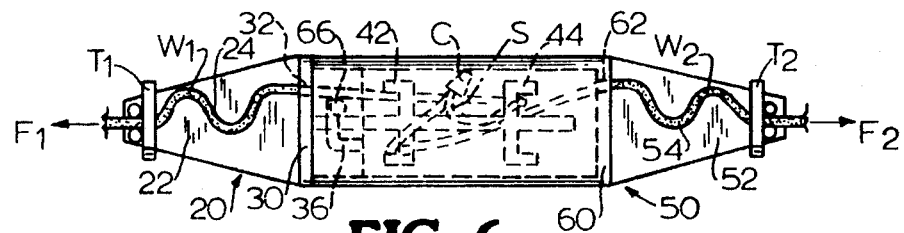
FIG. 6 is a side elevation view of the enclosure closed around the completed wire splice.

Fully closed enclosure 10 is shown in FIG. 6 with wires W1 and W2 protruding from each respective distal end. When an axial tension force is applied to the opposite ends of wires W1, W2, as portrayed by arrows F1 and F2 respectively, the tension force is largely sustained by tension tracks 24, 54 and hooks 42, 44, thus relieving the majority of tension from splice S enclosed within enclosure 10. In addition to protection against tension, enclosure 10 protects the enclosed wire splice S from environmental water and from sunlight exposure to extend the useful life of the spliced connection. Whereas the preferred embodiment of the enclosure is described as being generally round in cross section, the invention recognizes that other cross-sectional shapes, such as square, are adaptable to the major objects of the invention with modified locking means.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. An electrically insulative enclosure for the protection of a wire splice against environmental moisture and sunlight, comprising:

(a) a cap member formed of an electrically insulative material and adapted to receive an end of a first wire to be spliced to a second wire, said cap member having first integrally formed means to distribute the effect of tension applied to said first wire after splicing; and (b) a tube member formed of an electrically insulative material and adapted to receive an end of said second wire to be spliced to said first wire, said tube member configured to sealingly assemble to said cap member in a manner to enclose a splice formed between said first and second wire ends, said tube member having second integrally formed means to distribute the effect of tension applied to said second wire after splicing.

2. The enclosure as claimed in claim 1, wherein each said first and second means to distribute the effect of tension applied to said first and said second wire respectively includes structure defining a serpentine path configured to receive and secure each said wire to be spliced.

3. The enclosure as claimed in claim 2, wherein each said serpentine path defining structure is configured as a tension track formed to snugly surround each said wire respectively and engage at least half of the circumferential periphery thereof.

4. The enclosure as claimed in claim 1, further comprising a locking track formed into said cap member and a pin formed on said tube member which locking track and pin are configured and positioned to interengage with each other to maintain sealing contact between said first and second segments.

5. The enclosure as claimed in claim 1, further comprising wire support means formed to be enclosed within said enclosure when closed and adapted to support respective said wires adjacent said formed splice.

6. An enclosure for a wire splice, comprising:

(a) a cap member adapted to receive an end of a first wire to be spliced to a second sire, said cap member having first means to distribute the effect of tension applied to said first wire after splicing;

(b) a tube member adapted to receive an end of said second wire to be spliced to said first wire, and to sealingly assembly to said cap member in a manner to enclose a splice formed between said first and second wire ends, said tube member having second means to distribute the effect of tension applied to said second wire after splicing; and (c) each said first and second means to distribute the effect of tension applied respectively to said first and said second wires includes structure defining a serpentine path configured to receive and secure each said wire to be spliced.

7. The enclosure as claimed in claim 6 wherein each said serpentine path defining structure is configured as a tension track formed to snugly surround each said wire respectively.

8. An enclosure for a wire splice; comprising:

(a) a cap member adapted to receive an end of a first wire to be spliced to a second wire, said cap member having first means to distribute the effect of tension applied to said first wire after splicing;

(b) a tube member adapted to receive an end of said second wire to be spliced to said first wire, and sealingly assemble to said cap member in a manner to enclose a splice formed between said first and second wire ends, said tube member having second means to distribute the effect of tension applied to said second wire after splicing; and (c) each said first and second means to distribute the effect to tension applied respectively to said first and second wires includes a serpentine tension track formed to snugly surround each said wire and engage at least half of the circumferential periphery thereof.

* * * * *

UNITED STATES PATENT AND TRADEMARK OFFICE
CERTIFICATE OF CORRECTION

PATENT NO. : 5,519,171
DATED : May 21, 1996
INVENTOR(S) : Danny R. Vester

It is certified that error appears in the above-indentified patent and that said Letters Patent is hereby corrected as shown below:

Column 3, line 52, correct "books" to read --hooks--. (PTO error)

Signed and Sealed this

Twenty-third Day of July, 1996

Attest:

BRUCE LEHMAN

*Attesting Officer*   *Commissioner of Patents and Trademarks*